United States Patent [19]

Morishita et al.

[11] Patent Number: 4,651,575
[45] Date of Patent: Mar. 24, 1987

[54] VEHICLE STARTER AND GEAR STRUCTURE THEREFOR

[75] Inventors: Akira Morishita; Kyoichi Okamoto; Takemi Arima, all of Hyogo, Japan

[73] Assignee: Mitsubishi Denki Kabushiki Kaisha, Tokyo, Japan

[21] Appl. No.: 734,224

[22] Filed: May 15, 1985

[30] Foreign Application Priority Data

May 18, 1984 [JP] Japan .............................. 59-73330[U]

[51] Int. Cl.⁴ ...................... F02N 15/02; F16H 55/06; F16H 1/32
[52] U.S. Cl. ......................................... 74/7 E; 74/460; 74/801; 74/DIG. 10; 428/902
[58] Field of Search ................ 74/7 E, 460, DIG. 10, 74/801; 29/159.2; 418/152; 428/902

[56] References Cited

U.S. PATENT DOCUMENTS

| 4,346,615 | 8/1982 | Yoneda et al. | 74/7 A |
| 4,488,073 | 12/1984 | Morishita | 310/83 |
| 4,495,825 | 1/1985 | Ruhle | 74/7 E |
| 4,507,978 | 4/1985 | Tanaka et al. | 74/7 E |

FOREIGN PATENT DOCUMENTS

| 3045192 | 6/1982 | Fed. Rep. of Germany | 418/152 |
| 747650 | 9/1970 | France | 74/DIG. 10 |
| 58-77964 | 5/1983 | Japan | 74/DIG. 10 |
| 58-67977 | 5/1983 | Japan . | |
| 58-103567 | 7/1983 | Japan . | |
| 58-104361 | 7/1983 | Japan . | |
| 58-120874 | 8/1983 | Japan . | |
| 58-134056 | 9/1983 | Japan . | |
| 58-134676 | 9/1983 | Japan . | |

Primary Examiner—Allan D. Herrmann
Attorney, Agent, or Firm—Sughrue, Mion, Zinn, Macpeak & Seas

[57] ABSTRACT

A gear having a good balance of mechanical characteristics such as shock resistance, wear resistance, and flexible strength is molded from nylon resin containing 3–10 wt % of carbon fibers and 20–40 wt % of glass fibers.

17 Claims, 13 Drawing Figures

VEHICLE STARTER AND GEAR STRUCTURE THEREFOR

BACKGROUND OF THE INVENTION

This invention relates to a force transmitting mechanical gear molded from a synthetic resin, and more particularly to a gear structure used, for example, in a vehicle starter having a reduction gear mechanism.

A reduction gear type vehicle starter is well known, as shown in Japanese Utility Model publications Nos. 67977/83, 103567/83, 104361/83, 120874/83, 134056/83, and 134676/83, and in U.S. Pat. No. 4,346,615.

FIGS. 1 and 2 show a conventional vehicle starter having a gear reduction mechanism, wherein an internal gear 1a is formed on of the inner surface of a stationary intermediate bracket 1 made of synthetic resin. A sleeve bearing 2 is firmly fixed to a flange portion of the bracket. A cylindrical yoke 4 is coupled to a faucet joint portion 3a of a front bracket 3 overlying the bracket 1. A plurality of ferrite magnetic poles 5 are fixed to the inner surface of the yoke 4. An armature core 6, an armature coil 7 and an armature shaft 8 are rotatably disposed in the space formed by the cylindrical yoke.

A direct current motor M is composed of the yoke 4, poles 5, armature core 6, armature coil 7 and armature shaft 8. A packing 13 is disposed between the adjacent end portions of the yoke 4 and the intermediate bracket 1. An external sun gear 8a is formed on part of the outer surface of the armature shaft 8. A planet gear 9, having a sleeve bearing 9a fitted into its inner surface, meshes with the internal gear 1a and the external gear 8a, and is driven by the external gear. A pin 10 is fixed to a flange portion 11a of an output shaft 11. A ball bearing 12 for rotatably supporting the output shaft 8 is disposed between the armature shaft 8 and the output shaft 11.

With such a starter construction, when the motor M is energized the armature shaft 8 is rotated, and the planet gear 9 is driven by the external gear 8a formed on the shaft 8. The planet gear thus rides around the internal gear 1a, and transmits a rotating force with decreased speed from the armature shaft 8 through pin 10 and flange portion 11a to the output shaft 11.

In such a conventional reduction gear starter, the internal gear is made of molded synthetic resin such as nylon resin containing only one filler, such as carbon fibers or glass fibers. A gear made according to this conventional method has certain defects, however, as described below. When glass fibers are mixed into the synthetic resin mold material, although shock resistance improves, wear resistance deteriorates. On the other hand, when carbon fibers are mixed into the synthetic resin molding material, although wear resistance improves, shock resistance deteriorates. The cost of a gear made with carbon fibers is higher than that of a gear made with glass fibers as described above. In each case, satisfactory mechanical characteristics, such as flexible strength, shock resistance, required coefficient of friction, and wear resistance, cannot be obtained.

SUMMARY OF THE INVENTION

It is an object of the present invention to provide a gear structure having a good balance of mechanical characteristics, for example, shock resistance, wear resistance, and stiffness. It is another object of the invention to provide a gear structure having good mechanical characteristics using reduced amounts of the expensive carbon fibers in the synthetic resin molding material. These objects are accomplished by the provision of a gear made of synthetic resin molding material containing 3–10 wt % of carbon fibers and 20–40 wt % of glass fibers.

DETAILED DESCRIPTION OF THE PREFERRED EMBODIMENTS

Figure 1:
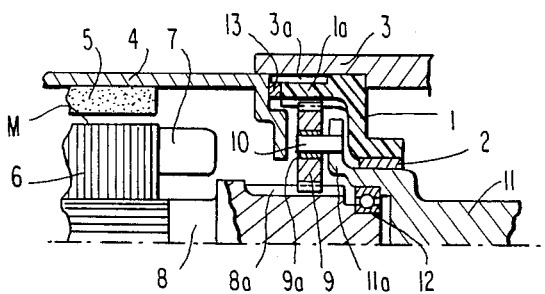
FIG. 1 is a longitudinal sectional view of one embodiment of a reduction gear type starter to which the present invention applies.
Figure 2A:
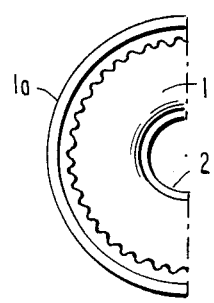
FIG. 2(a) is a partial view of one embodiment of a gear in accordance with the invention.
Figure 2B:
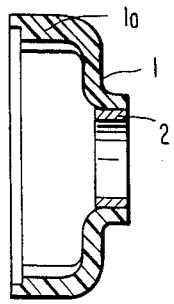
FIG. 2(b) is a longitudinal sectional view of FIG. 2(a)
Figure 3:
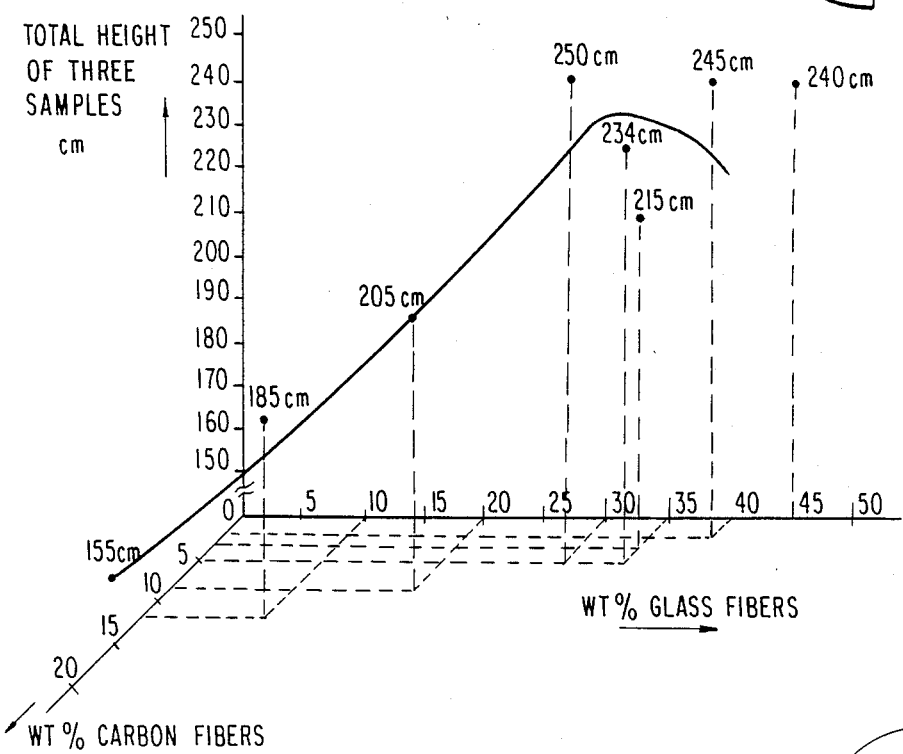
FIGS. 3 and 5 are graphs showing the relation between shock resistance and the percentage of carbon fibers and glass fibers present in a synthetic resin molding material.
Figure 4:
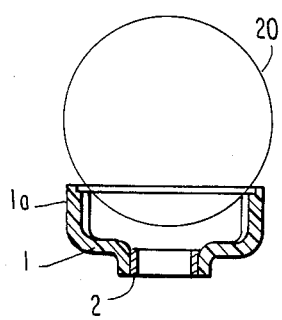
FIGS. 4 and 6 are views showing the test method used to obtain the results shown in FIGS. 3 and 5, respectively.

Referring now to FIGS. 3 to 12, there are shown various characteristics of the internal gear according to the percentages of carbon fibers and glass fibers mixed into a synthetic resin molding material. FIG. 3 is a graph showing shock resistance (shock test A) with varying percentages of carbon fibers and glass fibers mixed into a synthetic resin molding material. In FIG. 3 the values indicated by dots with some numerical values indicate the greatest height from which a one-pound weight 20 could be dropped on the open side of one of three test samples without damaging the sample. The solid line shows values obtained by the least squares method. FIG. 3 also shows that, when 5 wt % of carbon fibers and 35 wt % of glass fibers are mixed into a synthetic resin molding material, the greatest degree of shock resistance is obtained.

Figure 5:
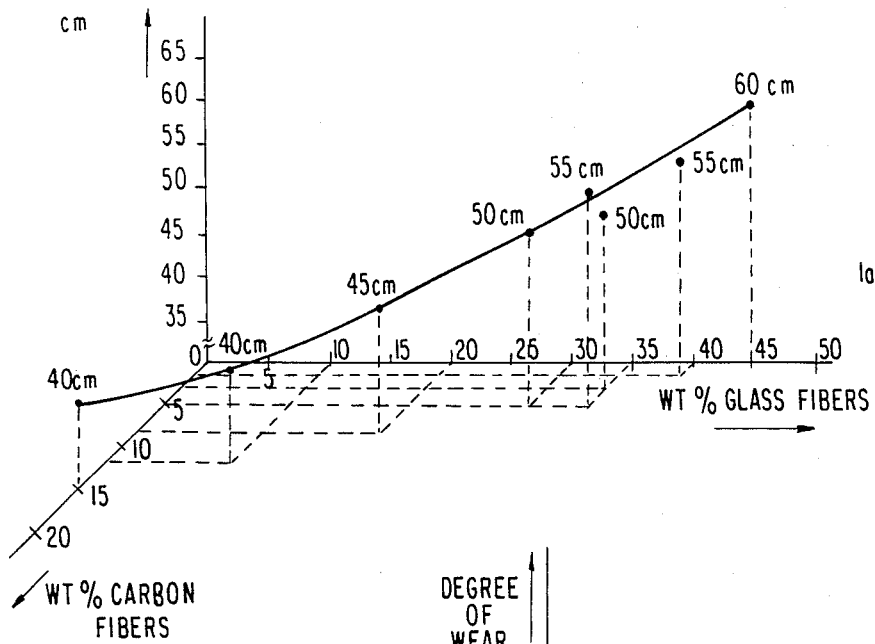
Figure 6:
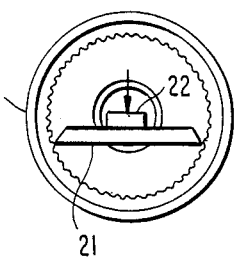

FIG. 5 is another graph showing shock resistance (shock test B) with various percentages of carbon fibers and glass fibers mixed into a synthetic resin molding material. In FIG. 5 the values indicated by dots with some numerical values indicate the greatest height from which a one-pound weight 20 could be dropped on an iron plate 22 (FIG. 6 disposed on an iron plate 21 suspended between teeth of the internal gear 1a. The solid line shows values obtained by the least squares method.

Figure 7:
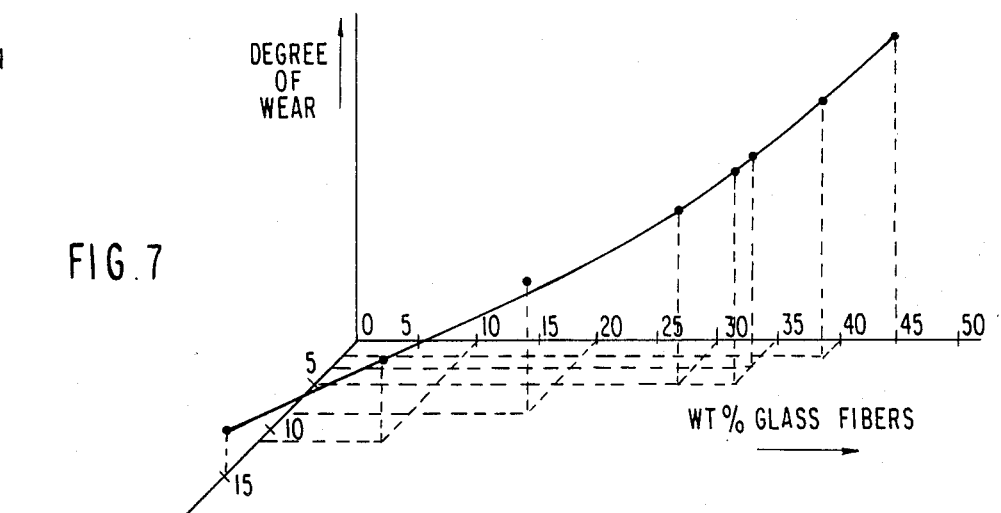
FIG. 7 is a graph showing the relation between the coefficient of wear and the percentages of carbon fibers and glass fibers present in synthetic resin molding material.
Figure 8:
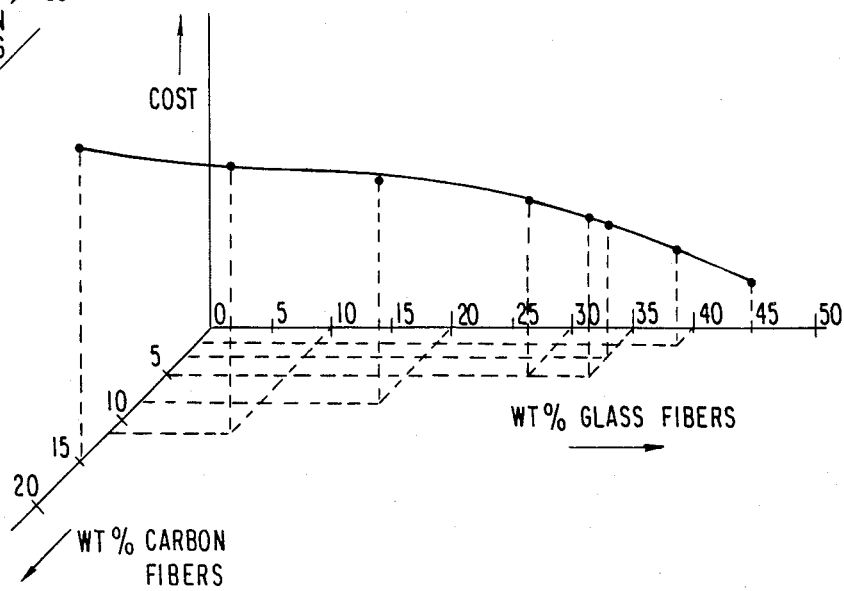
FIG. 8 is a graph showing the relation between cost and the percentages of carbon fibers and glass fibers present in a synthetic resin molding material.

FIG. 5 shows the increased shock resistance with increased percentage of glass fibers. FIG. 7 shows increased coefficient of wear of the internal gear 1a with decreased percentage of carbon fibers and increased percentages of glass fibers. FIG. 8 is a graph showing cost as a function of percentages of glass fibers and carbon fibers used in fabricating the internal gear 1a, and shows decreased cost with decreased percentage of carbon fibers. Table 1 shows the experimental data used in plotting the above-mentioned graphs.

TABLE 1

| Sample No. | % wt glass fiber | % wt carbon fiber | (a)shock test A (FIG. 3) | (b)shock test B (FIG. 5) | wear ranking | cost ranking | total evaluation |
|---|---|---|---|---|---|---|---|
| 1 | 0% | 15% | 155 cm | 40 cm | 1 | 8 | X |
| 2 | 10 | 11.6 | 185 | 40 | 2 | 7 | X |
| 3 | 20 | 8.33 | 205 | 45 | 3 | 6 | O |
| 4 | 30 | 5 | 250 | 50 | 4 | 5 | O |
| 5 | 35 | 5 | 234 | 55 | 5 | 4 | O |
| 6 | 35 | 3.33 | 215 | 50 | 6 | 3 | O |
| 7 | 40 | 1.67 | 245 | 55 | 7 | 2 | X |
| 8 | 45 | 0 | 240 | 60 | 8 | 1 | X |

(a)total height of three samples
(b)total height of two samples

Table 1, taken in conjunction with the above-mentioned Figures, shows that where the percentage of carbon fibers is 3-10 wt % and the percentage of glass fibers is 20-40 wt %, and especially where the percentage of carbon fibers is 5 wt % and the percentage of glass fibers is 35 wt %, an internal gear having the most favorable characteristics is obtained.

Figure 9:
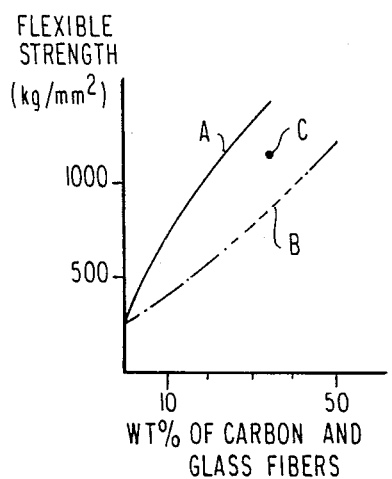
FIG. 9 is a graph showing the relation between flexible strength and the percentages of carbon fibers and glass fibers with a synthetic resin molding material.

Referring to FIGS 9-12, the mechanical characteristics of the nylon resin molding material containing 5 wt % carbon-fibers and 35 wt % glass fibers are described. FIG. 9 is a graph showing the result of a flexible strength test executed in accordance with the requirements of the American Society for Testing and Materials (ASTM)-D790. In FIG. 9 flexible strength [kg/mm$^2$] is shown on the ordinate and the wt % of the carbon and glass fibers in the nylon resin is shown on the abscissa.

In FIG. 9 curve A shows the flexible strength characteristic where only carbon fibers are present in the filler within nylon resin, curve B shows the flexible strength characteristic where only glass fibers are present in the filler within nylon resin, and the point C shows the flexible strength value where 5 wt % carbon fibers and 35 wt % glass fibers are present in the filler within nylon resin. FIG. 9 shows that the compound used in the present invention has a medium value of flexible strength because of the effect of the carbon fibers and glass fibers.

Figure 10:
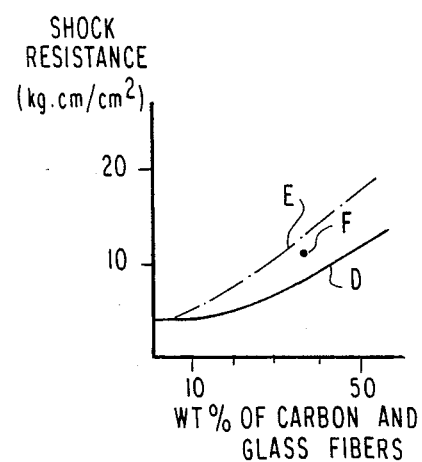
FIG. 10 is a graph showing the relation between Izod shock resistance and the percentages of carbon fibers and glass fibers present within a synthetic resin molding material.

FIG. 10 is a graph showing the results of tests executed in accordance with the American Society for Testing and Materials (ASTM)-D256. In FIG. 10 Izod shock resistance [kg·cm/cm$^2$] is shown on the ordinate and the wt % of carbon and glass fibers in the nylon resin shown on the abscissa. In FIG. 10 curve D shows the degree of shock resistance where only carbon fibers are present within the nylon resin, curve E shows the degree of shock resistance where only glass fibers are present within the nylon resin, and the point F shows the shock resistance value where 5 wt % carbon fibers and 35 wt % glass fibers are present within the nylon resin. FIG. 10 shows that the compound of the present invention has excellent shock resistance characteristics close to those for the case in which only glass fibers are contained within the synthetic resin (curve E).

Figure 11:
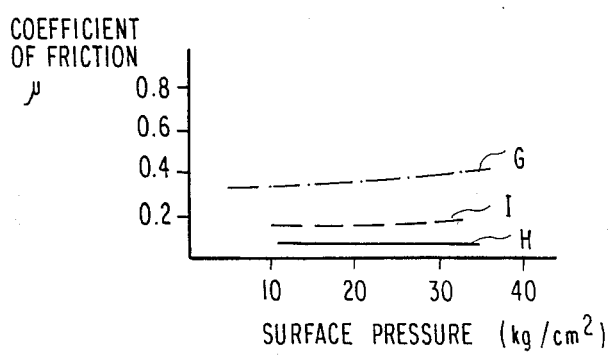
FIG. 11 is a graph showing the relation between the coefficient of friction and the amount of surface pressure on a test piece.

FIG. 11 shows the coefficient of friction measured by a Suzuki type wearing test machine. In FIG. 11 the coefficient of friction between testing material and soft iron is shown on the ordinate and the pushing force (surface pressure) [kg/cm$^2$] is shown on the abscissa. In FIG. 11 curve G shows the coefficient of friction for nylon resin which contains 30 wt % glass fibers, curve H shows the coefficient of friction for nylon resin containing 30 wt % carbon fibers, and curve I shows the coefficient of friction for nylon resin containing 5 wt % carbon fibers and 35 wt % glass fibers. FIG. 11 shows that the present invention has a low coefficient of friction.

Figure 12:
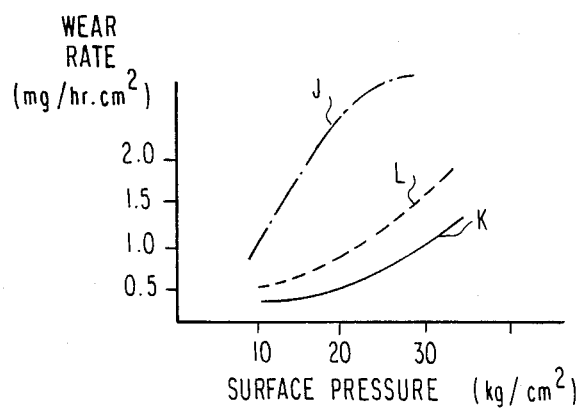
FIG. 12 is a graph showing the relation between the wear rate and the amount of surface pressure on a test piece.

FIG. 12 shows the rate of wearing as measured by a Suzuki type wear test machine. In FIG. 12 the rate of wear [mg/hr·cm$^2$] is shown on the ordinate, the wear rate being measured by slidably attaching the testing piece to soft iron. The pushing force (surface pressure) [kg/cm$^2$] is shown on the abscissa. In FIG. 12 curve J shows the wear gate for nylon resin containing 30 wt % glass fibers, curve K shows the wear rate for nylon resin containing 30 wt % carbon fibers, and curve L shows the wear rate for nylon resin containing 5 wt % carbon fibers and 35 wt % glass fibers. FIG. 12 shows that the compound of the present invention has a low wear rate, close to that of a nylon resin containing 30 wt % carbon fibers (curve K.)

Although the invention has been described in connection with the internal gear of a reduction type starter, it is also applicable to the planet gear to gears used for other than starters. In addition, it is possible to add material other than carbon fibers and glass fibers to the synthetic resin molding material. The present invention is applicable not only to thermoplastic nylon resin but also to thermosetting resin.

What is claimed is:

1. A force transmitting mechanical gear molded from a synthetic resin material containing 3-10 wt % of carbon fibers and 20-40 wt % of glass fibers.

2. A force transmitting mechanical gear as claimed in claim 1, wherein said synthetic resin material is nylon resin.

3. A force transmitting mechanical as claimed in claim 1, said synthetic resin material containing 5 wt % carbon fibers and 35 wt % glass fibers.

4. A force transmitting mechanical gear as claimed in claim 3, wherein said synthetic resin material is nylon resin.

5. A vehicle starter, comprising a reduction gear mechanism and means for driving said mechanism, wherein said mechanism includes at least one gear molded from a synthetic resin material containing 3-10 wt % of carbon fibers and 20-40 wt % of glass fibers.

6. A vehicle starter as claimed in claim 5, wherein said synthetic resin material is nylon resin.

7. A vehicle starter as claimed in claim 5, said synthetic resin material containing 5 wt % carbon fibers and 35 wt % glass fibers.

8. A vehicle starter as claimed in claim 7, wherein said synthetic resin material is nylon resin.

9. A vehicle starter as claimed in claim 5, wherein said mechanism is a planet gear type mechanism, including at least a sun gear, a planet gear, and an internal gear.

10. A vehicle starter as claimed in claim 9, wherein said at least one gear is said internal gear.

11. A vehicle starter as claimed in claim 10, wherein said synthetic resin material is nylon resin.

12. A vehicle starter as claimed in claim 10, said synthetic resin material containing 5 wt % of carbon fibers and 35 wt % of glass fibers.

13. A vehicle starter as claimed in claim 12, wherein said synthetic resin material is nylon resin.

14. A planet gear type reduction mechanism comprising a sun gear, a planet gear, and an internal gear, at least said internal gear being molded from a synthetic resin material containing 3-10 wt % of carbon fibers and 20-40 wt % of glass fibers.

15. A planet gear type reduction mechanism as claimed in claim 14, wherein said synthetic resin material is nylon resin.

16. A planet gear type reduction mechanism as claimed in claim 14, wherein said material contains 5 wt % of carbon fibers and 35 wt % of glass fibers.

17. A planet gear type reduction mechanism as claimed in claim 16, wherein said synthetic resin material is nylon resin.

* * * * *